Dec. 12, 1967   J. W. STEPHENS   3,357,281
DRILLING JIGS
Filed Oct. 11, 1965                                4 Sheets-Sheet 1

INVENTOR
JAMES W. STEPHENS
By Emory L. Groff Jr.
Atty

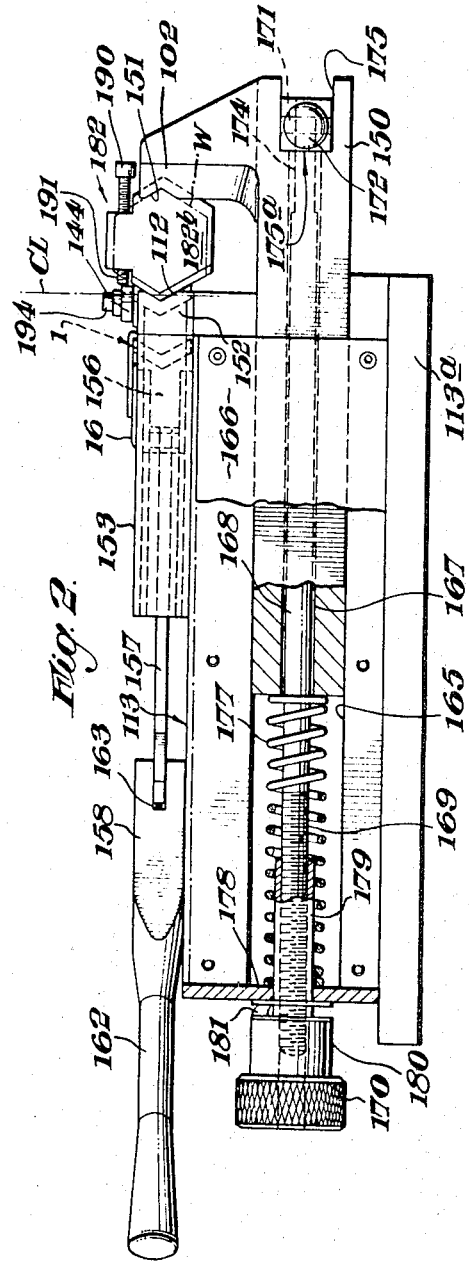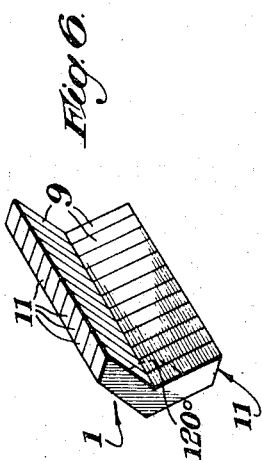

Dec. 12, 1967  J. W. STEPHENS  3,357,281
DRILLING JIGS

Filed Oct. 11, 1965  4 Sheets-Sheet 4

INVENTOR
JAMES W. STEPHENS
BY Emory G. Groff Atty

United States Patent Office 3,357,281
Patented Dec. 12, 1967

3,357,281
DRILLING JIGS
James William Stephens, 22 Caxton Hill Industrial Estate,
Ware Road, Hertford, England
Filed Oct. 11, 1965, Ser. No. 494,809
Claims priority, application Great Britain, Jan. 11, 1965,
1,157/65
1 Claim. (Cl. 77—62)

ABSTRACT OF THE DISCLOSURE

A wire hole drilling jig for hexagon nuts which consists of a chevron shape guide blank which is held in a holder and can be fed to a fixed jaw of a pair of which the other jaw is spring loaded and slidably adjustable by means of a draw bar actuator and a screw adjustment into a suitable open position for receiving the hexagon to be drilled, the draw bar having a cam lever which can be aligned therewith to close the jaw into work gripping position.

---

This invention relates to drilling jigs, and is particularly concerned with drilling jigs for drilling small holes as may be required for locking wires across the corners of hexagons which normally present some difficulty, especially when the material of the component with the hexagon is stainless steel or like hard metal, or other material of extreme hardness. The difficulty arises from the fact that the drill has to enter and leave the material with its drilling axis at an acute angle to the hexagon surface, and this calls for a skilled operator and extreme care both in setting up and during the actual drilling operation to avoid wandering of the drill, with consequent work hardening of the metal and breakage of the drill in the component. A broken drill in a component means inevitable wastage of the component, with serious financial loss in material and labour.

In British specification No. 882,805 there is described an improved drilling jig which overcomes this difficulty, and avoids drill breakage and loss of components arising therefrom, whilst giving simplicity and accuracy in operation, and which permits a wire hole drilling in stainless and like hard steels by unskilled labour at a greater speed than has hitherto been possible.

The present invention is concerned with a drilling jig of the character described in British specification No. 882,805, and the object of the present invention is mainly concerned with simplifying the guide blank holder and the method of holding the hexagon for feeding the chevron guide element thereto which constitutes the actual guiding jig for the drill itself.

The drilling jig according to the aforesaid specification in its particular form is constituted by a chevron blank which is a symmetrical V with two legs forming a V-shape groove which can embrace and seat on the corner of a hexagon component work piece, the legs having inner component fitting surfaces with an included angle of 120° between them so that they can fit closely against the inclined surfaces of the hexagon corner. The end surfaces of the chevron blanks are mutually parallel and at 60° to the component fitting surfaces, so that when in the drilling of such end surfaces such surfaces come at right angles to the vertical drilling axis of the drill, the upper surface being the drill entrance surface, and the lower surface the drill leaving or exit surface. Such a chevron is reversible so that either of the parallel surfaces may be the drill entrance or drill leaving surface. These chevron blanks are made of a softer metal such as mild steel, and once the drilling has been made, the chevrons are discarded, a new one being used for each drilling operation.

In the aforesaid specification the hexagon was held in position by a machine vice, the movable or adjustable jaw of which had a suitable notch to receive the corner of the hexagon while the opposite jaw supported a body plate or holder which had a similar notch for receiving the opposite corner of the hexagon.

According to the present invention, instead of the machine vice, the holder itself accommodates an adjustable locking jaw plate in which is mounted a cam locking lever for retracting and closing the jaw against the pressure of a spring, and provided with means for adjusting the jaw relatively to a fixed workpiece gripping element or jaw to enable different sizes of hexagon or workpiece to be held in position for feeding a chevron blank thereto.

Other features of the invention will appear from the following description, which is to be read in conjunction with the accompanying drawings, in which:

FIGURE 2 is a side elevation from the front of FIGURE 1.

FIGURE 5 is small detail to an enlarged scale of the workpiece with the wire hole drilled through the corner.

FIGURE 6 shows a battery of chevron adhesively held together.

Figure 1:
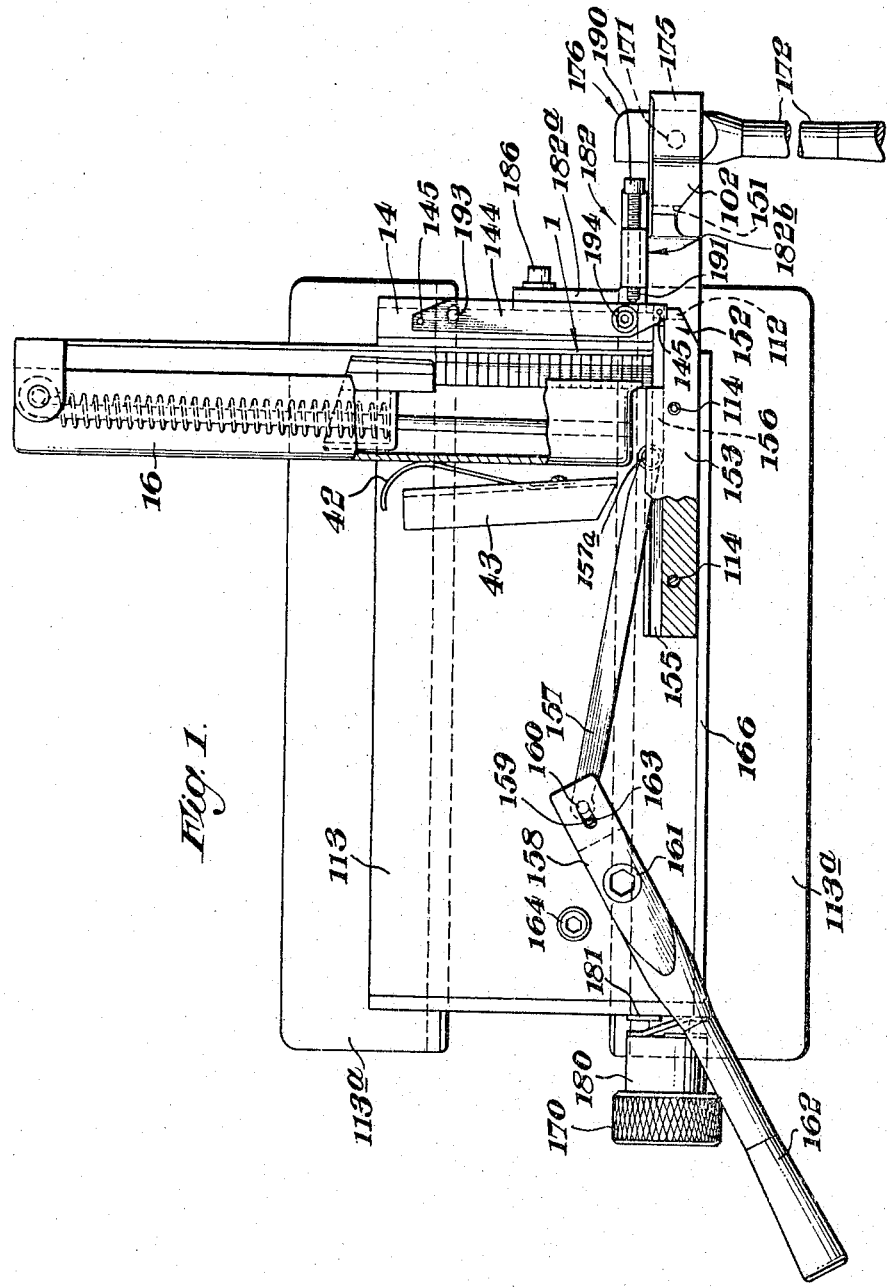
FIGURE 1 is a plan of the wire hole drilling jig according to the invention.
Figure 3:
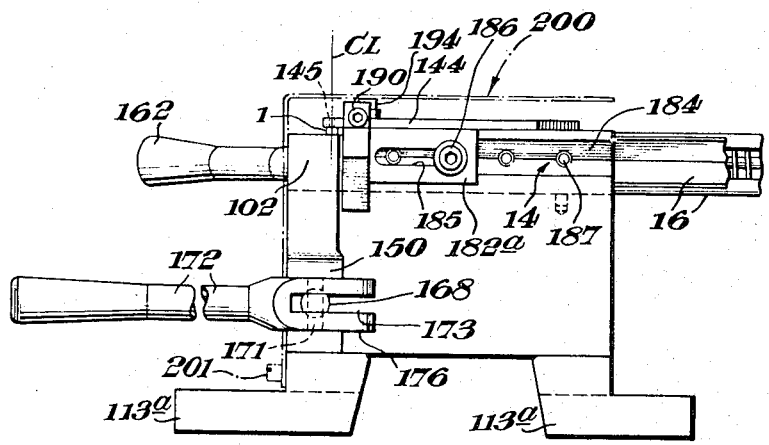
FIGURE 3 is an end elevation looking from the work clamping end of the holder.

In carrying out the invention, a group of chevrons 1 held together by inter-facial adhesive (FIGURE 6) are adapted to be mounted for feeding from a removable cartridge 16 of said chevrons, as described in the aforesaid specification, and the holder comprises an extended body plate 113 upon which the cartridge may be placed approximately at right angles to the length of the plate and held in position by a flat spring 42 and body portion assembly 43, also as described in the aforesaid specification. At the cartridge end of the holder plate there is a cartridge support bar 14, and alongside the front of the holder at right angles to the support bar there is mounted the clamping jaw member 102 in the form of a flat L-shape slide plate 150, the foot of the L providing the upstanding jaw which has a V-notch 151 for engaging one corner of the hexagon workpiece W (FIGURE 4), the opposite corner of the workpiece being held by a fixed jaw 152 having a notch or groove 112 of V-shape formed at the end of a guide block 153 which is secured by screws 114 to the body plate 113 parallel to and above the adjustable clamping jaw plate 150. In this guide 153 there is a longitudinal guide slot 155 in which slides the chevron feed slide 156 forming part of toggle feed mechanism for feeding the chevron blanks 1 to the hexagon workpiece W through the slot 17. This toggle feed mechanism is similar to that described in the aforesaid specification.

Figure 4:
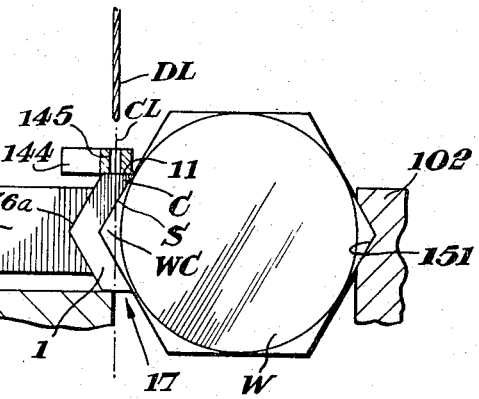
FIGURE 4 is a detail to an enlarged scale of the means for clamping the workpiece into position for wire hole drilling.

The toggle feed mechanism consists of a pair of toggle levers 157, 158 connected at the toggle knee by an elongated slot 159 engaging over a pivot pin 160 with an incorporated control spring 163 in the joint. The lever 157 is connected by pivot pin 157a to the feed slide 156, and the other lever 158 is mounted on a fixed pivot 161 positioned on the body plate 113 slightly offset from the slide 156. The lever 158 extends beyond the pivot 161 into handle 162. The drawing shows the feed slide 156 in the position where it has fed a chevron 1 to the hexagon corner of the workpiece W (FIGURE 4). It will be noted that the feeding end of the slide has a V-shape jaw 156a corresponding to the shape of the chevrons. In this position the toggle levers 157 and 158 are cranked (FIGURE 1) but by further clockwise turning of the handle 162 about pivot 161 the levers 157, 158 move to the aligned locking position (pin 160 moving along slot 159 against pressure of the control spring 163). In this position, the slide jaw 156a (FIGURE 4) clamps the chevron 1 on to the workpiece W. To release the used chevron after drilling, the toggle handle 162 is turned anti-clockwise to withdraw the feed slide to the left (FIGURE 1), a stop 164 on the holder body plate 113 limiting the throw of the handle. Once the chevron 1 has been clamped by the slide 156, and the drilling bar 144 has been positioned so that the drill guide hole 145 thereon is correctly located over the adjacent end face 11 of the end place chevron 1, the drilling operation can commence. The drill DL (FIGURE 4) passes through the guide hole 145 and through the chevron corner C along the centre line CL so that it is positively held from wander as it strikes the hard inclined surface S of the work piece corner WC, and this is thence guided through the workpiece corner to make the clean wire hole WH therethrough. From the drawing it will be seen that each chevron drill blank is in the form of a symmetrical V with two legs forming a V-shape groove which can embrace and seat on the corner WC of the hexagon component workpiece W, the legs having inner component fitting surfaces 9 with an included angle of 120° between them so that they fit closely against the inclined surface of the hexagon corner, as is shown particularly clearly in FIGURE 4. The end surfaces 11 of the chevron blanks are mutually parallel and at 60° to the component fittings surfaces 9, so that when in the drilling position shown in FIGURE 4 such surfaces come at right angles to the vertical drilling axis of the drill DL, the upper surface 11 being the drill entrance surface, and the lower surface the drill leaving or exit surface. But, as will be observed, the chevron blanks are reversible, so that either surface 11 may be the drill entrance or drill leaving surface.

For the purpose of drilling into a component workpiece of stainless or like hard steel, it is important that the chevron blanks shall be made of a softer metal, and it has been found that mild steel is a suitable metal. When once used, the respective chevrons shown are described, a new one being used for each drilling operation.

As will be seen, the respective chevron blanks 1 are fed to the workpiece corner individually, and to ensure the required result they must be held securely and to the corner while the drilling operation is in progress. Hence the positive gripping and battery arrangement of the chevrons, as has been previously described.

The jaw slide 150 with its work clamping jaw 102 is mounted in a guide housing 165 in the side of the body plate 113, this guide housing being closed by the front plate 166 of the holder. Extending through the jaw slide 150 is a longitudinal slot 167 in which is housed a draw bar 168 which is screw-threaded at one end 169 to receive an adjusting knob 170, and at the other end has a pivot connection 171 with a cam lock lever 172. The end 173 adjacent the pivot 171 of the lever 172 is forked to engage over the flattened end 174 of the draw bar, and the forked end 173 works in an open ended slot 175 in the jaw slide 150. At the heel of the forked end 173 there is a cam contour surface 176 which is positioned and shaped to engage the back end of the slot 175 in the jaw slide 150, so that when the cam block lever 172 is brought into alignment with the jaw slide bar 150 the jaw 102 itself is closed towards the fixed bar 152 to clamp the hexagon workpiece W when in position, as shown in FIGURE 4. The jaw slide 150 is acted upon by a coil spring 177 surrounding the draw bar 168 and taking abutment against a fixed anchor plate 178 forming part of the jig base 113 or holder, so that the jaw is normally pressed open toward the open position by the spring 177. The adjusting knob 170 has an internally threaded extension sleeve 179 which screws on to the draw bar 168 and terminates in an enlarged boss 180 forming a shoulder against which a second shorter coil spring 181 engages and takes abutment on the opposite side of the anchor plate 178 so as normally to pull the draw bar axially away from the clamping jaw 102. The adjusting knob has a knurled terminal and, as indicated, for hand or finger control which projects externally of the jig base 113, while the lock lever 172, together with the clamping jaw 102, projects beyond the jig holder base at the opposite end.

To set up the clamping arrangement, the cam lock lever 172 will be turned at right angles to the draw bar 168 so that the clamping jaw 102 is pressed outwardly by the main spring 177 to a predetermined "open" position suitable for receiving the workpiece W between the jaws 152 and 102. This "open" position can be adjusted by manipulation of the adjusting knob the draw bar which is thereby virtually lengthened or shortened, so that the clamping jaw 102 is moved longitudinally outward under the action of the spring 177, or closed by an opposite rotation of the adjusting knob 170 to draw the clamping jaw 102 longitudinally inward against the action of its spring towards its complementary fixed jaw 152, this effect being due to the fact that the rotation of the adjusting knob 170 causes the draw bar 158 to move axially, and by virtue of the engagement of the cam lever end 176 with the back end 175a of the slot 175 in the jaw slide 150 the required motion is transmitted to the jaw slide.

It will be observed that when the slidable jaw 102 is brought into the work gripping position shown in FIGURE 4, by straightening the cam lever 172 into line with the draw bar 169, the spring 181 pressing on the adjusting knob 170 will be slightly compressed as the cam 176 effects displacement of the jaw plate 150.

Figure 7:
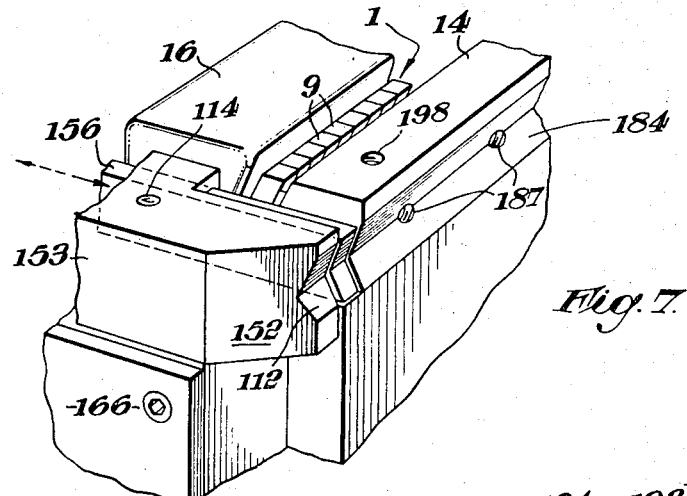
FIGURE 7 is a detail pictorial view of the relatively fixed holding jaw and the associated chevron feed slide and support bar.
Figure 8:
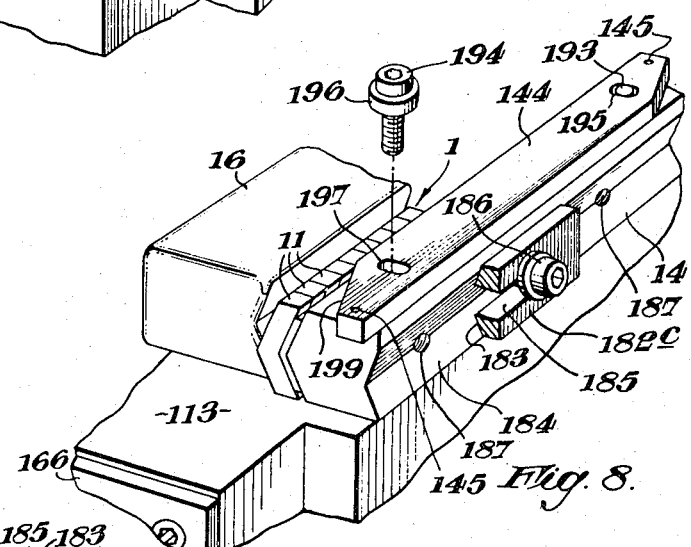
FIGURE 8 is a detail pictorial view of the stop element for predetermining the position of the workpiece and of the cartridge support bar for the chevron.
Figure 9:
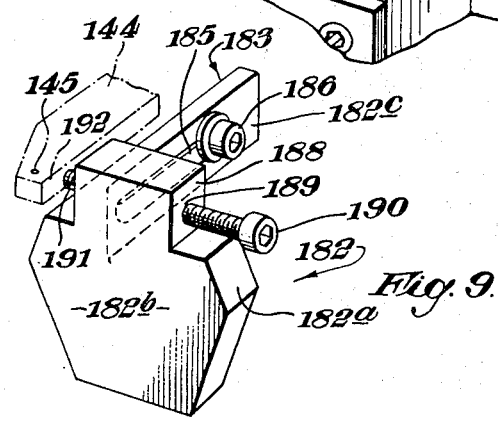
FIGURE 9 is a complete detail in pictorial view of the stop element, only part of which is shown in FIGURE 8.

By virtue of the improved clamping arrangement, an improved stop construction may be utilised in accordance with the invention for holding the workpiece W in relation to the chevron feeding slot 17 (FIGURES 4, 7 and 8 in particular). According to the invention the stop element 182 (see FIGURES 8 and 9 particularly) consists of a right-angled piece which is mounted on the end of the work holder or jib base 113 by means of an elongated pin and slot arrangement so that it can be adjusted backwards and forwards at right angles to the plane of the jaw 102. The stop piece thus comprises a stop leg 182a having a flat abutment face 182b against which the inner face of the workpiece W is located. The stop piece also has a mounting leg 182c which has a V-shape side 183 which fits a V-channel 184 in the cartridge support bar 14. On the opposite side the leg 182a is flat, and extending along the leg is an elongated through slot 185 through which can be passed a screwed mounting pin 186 which screws into any one of a plurality of screwed mounting holes 187 in the bar 14. The abutment leg 182a has an upward projection 188 which has a screwed hole 189 extending lengthwise and parallel to the face 182b to receive a screw adjustment pin 190, having a leading end 191 for engaging the adjacent corner 192 of the bar 144 which guides the drill DL into the positioned chevron jig 1.

This drill guide bar 144 is mounted on two spaced-apart pivot pins 193, 194 on the cartridge support bar 14 in such a way that it can be caused to oscillate about the pin 193 by adjustment of the pin 190 on the stop element 182. The pivot pin 193 engages in a bearing hole 195 in the drill guide bar at one end thereof, while the other pin 194—which has a clamping head 196—engages in an elongated slot 197 in and extending transversely of the opposite end of the bar 144, the pin 194 being screw fitted in a tapped hole 198 in the support bar 14 so that after the drill guide has been positioned as required, the position may be held by screwing down the pin until the head 196 clamps on to the bar 144. Thus the drill guide hole 145 in the end of the drilling body bar may be positioned within the range of the adjustment across the corner of the hexagon workpiece W in the required position for drilling. The drilling hole in the body bar is formed through the corner end 192 of the said bar 144, which is cut away on the opposite corner 199 to enable the bar to clear adjacent components of the holder during adjustment. Both ends of the bar 144 may be of similar character, so that the bar is reversible for different sized drills, and thus, in this instance, the pivot bearing hole 195 is also elongated to correspond with slot 197. For this purpose the drill guide holes 195 will then be of different diameter in the ends of the bar 144 to provide the necessary guiding action of the appropriate drill.

A convenient cover 200 of right angle shape may be provided for mounting over the top of the assembly on the jig holder, and may be held in position by means of a screw mounting 201 into the jig base 113. It will also be observed that this jig base has support feet 113a to give a firm support to the holder in any required position, and enabling it, if desired, to be mounted on a suitable work base.

I claim:

In a wire hole drilling jig for drilling chordwise across the corner of a workpiece, wherein a holder for a chevron shape guide blank comprises a body plate having mounted thereon, (i) a drill guide having a drill guide hole,
(ii) means for feeding a blank to said guide in a position for drilling therethrough,
(iii) means including a pair of workpiece gripping jaws positioned adjacent the guide for holding the corner of the workpiece in line with the drill guide hole through the guide, one jaw being relatively fixed and the other relatively adjustable and constituted by slidable jaw plate, the improvement which comprises:
(iv) a draw bar passing through the plate,
(v) spring means housed in the body plate and carried by the draw bar to apply pressure on the slidable jaw plate to open the latter in relation to the fixed jaw,
(vi) a screw adjustment on one end of said draw bar controlling the spring means to predetermine an open position between the jaws according to the size of the workpiece to be gripped therebetween, and
(vii) means including a cam lever carried on the opposite end of said draw bar and movable to cause its cam to displace the slidable jaw into workpiece gripping position.

References Cited

UNITED STATES PATENTS 2,408,537   6/1946   Downing _____ 77—62

FOREIGN PATENTS 882,805   11/1961   Great Britain.

FRANCIS S. HUSAR, *Primary Examiner.*